United States Patent
Barkhordarian et al.

(10) Patent No.: US 7,833,928 B2
(45) Date of Patent: Nov. 16, 2010

(54) METALLIFEROUS, HYDROGEN-STORING MATERIAL AND PROCESS FOR ITS PRODUCTION

(75) Inventors: Gagik Barkhordarian, Geesthacht (DE); Thomas Klassen, Wentorf (DE); Rüdiger Bormann, Rosengarten (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 1016 days.

(21) Appl. No.: 10/568,690

(22) PCT Filed: Aug. 12, 2004

(86) PCT No.: PCT/DE2004/001804

§ 371 (c)(1),
(2), (4) Date: Dec. 4, 2006

(87) PCT Pub. No.: WO2005/019097

PCT Pub. Date: Mar. 3, 2005

(65) Prior Publication Data

US 2007/0068342 A1     Mar. 29, 2007

(30) Foreign Application Priority Data

Aug. 19, 2003   (DE) ................. 103 37 970

(51) Int. Cl.
B01J 21/18 (2006.01)
B01J 27/20 (2006.01)
H01M 4/58 (2010.01)
H01M 4/56 (2006.01)

(52) U.S. Cl. ............... 502/174; 423/419.1; 423/420.2; 423/421; 423/430; 429/218.2; 429/225; 429/227; 420/900

(58) Field of Classification Search ............... 502/174; 423/419.1, 420.2, 421, 430; 429/218.2–225, 429/227; 420/900
See application file for complete search history.

(56) References Cited

U.S. PATENT DOCUMENTS

| 4,621,034 | A | * | 11/1986 | Kanda et al. | ............... 429/59 |
| 5,906,792 | A | * | 5/1999 | Schulz et al. | ............... 428/649 |
| 6,171,727 | B1 | * | 1/2001 | Ogura et al. | ............ 429/218.2 |
| 6,752,881 | B2 | * | 6/2004 | Klassen et al. | ............. 148/400 |
| 7,229,600 | B2 | * | 6/2007 | Yadav | ........................ 423/263 |

(Continued)

FOREIGN PATENT DOCUMENTS

CA            2 368 437        * 10/2000

(Continued)

OTHER PUBLICATIONS

"Mechanical alloying and milling," C. Suryanarayana. Progress in Materials Science 46 (2001), pp. 1, 122, and 123.*

*Primary Examiner*—Patricia L Hailey
(74) *Attorney, Agent, or Firm*—Marshall, Gerstein & Borun LLP

(57) ABSTRACT

The invention relates to a metal-containing, hydrogen-storing material which contains a catalyst for the purpose of hydration or dehydration, said catalyst being a metal carbonate. The method for producing such a metal-containing, hydrogen-storing material is characterized by subjecting the metal-containing material and/or the catalyst in the form of a metal carbonate to a mechanical milling process.

25 Claims, 1 Drawing Sheet

U.S. PATENT DOCUMENTS

Figure 1:
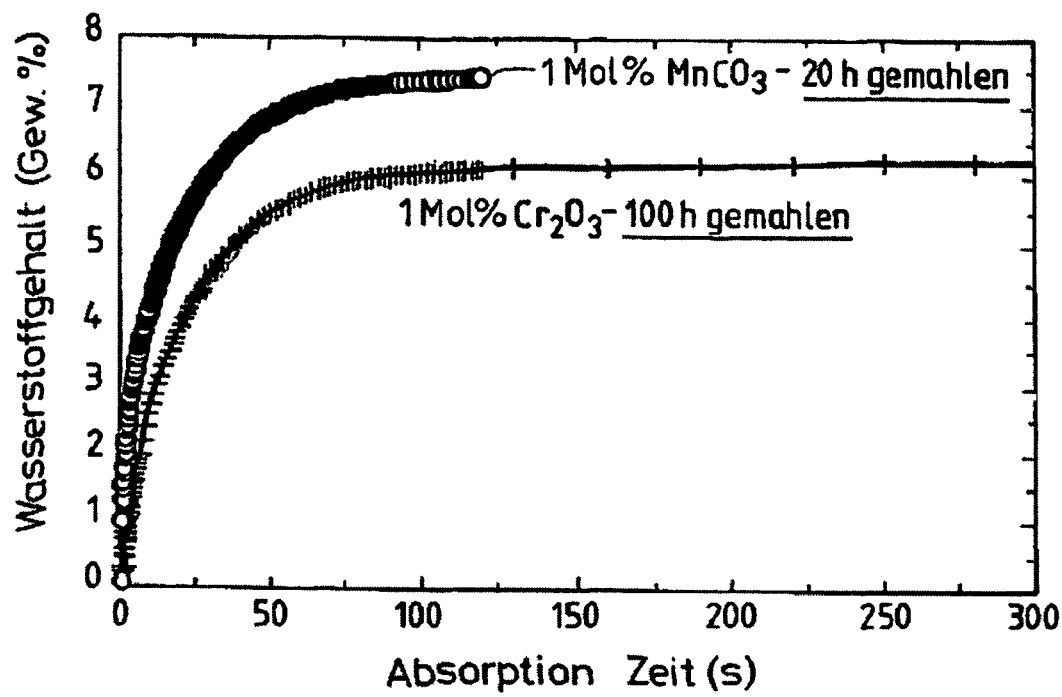

2003/0013605 A1    1/2003    Klassen et al.

FOREIGN PATENT DOCUMENTS

| | | |
|---|---|---|
| DE | 199 13 714 A1 | 9/2000 |
| EP | 0 936 686 A1 | 8/1999 |
| EP | 1 100 141 A1 | 5/2001 |
| JP | 09003584 A | 1/1997 |
| JP | 10-092422 * | 4/1998 |
| WO | WO-03056646 A1 | 7/2003 |

* cited by examiner

METALLIFEROUS, HYDROGEN-STORING MATERIAL AND PROCESS FOR ITS PRODUCTION

The present application claims the benefit of priority of International Patent Application No. PCT/DE2004/001804 filed on Aug. 12, 2004, which application claims priority of German Patent Application No. 103 37 970.3 filed Aug. 19, 2003. The entire text of the priority application is incorporated herein by reference in its entirety.

The invention relates to a metalliferous, hydrogen-storing material which contains a catalysing agent for its hydrogenation or dehydrogenation and to a process for the production of a metalliferous, hydrogen-storing material.

A metalliferous material and a process of this type are known (DE-A-199 13 714). In the above-mentioned document, the storage of hydrogen by means of metal hydrides has been described. It is known that hydrogen as such is an ideal carrier of energy since water is formed exclusively on its re-conversion into energy. Hydrogen itself can be produced from water by means of electric energy.

By means of this so to speak ideal energy carrier of hydrogen, it is possible to hydrogenate, i.e. to charge, a hydrogen storage with electrical energy at certain sites where it is produced, to transport it to other sites and to dehydrogenate it, i.e. to release it, where there is a requirement for energy and to utilise the energy being released for the desired purpose, water again being formed during the re-conversion. However, one problem still always arises when using hydrogen as energy carrier which, although having been provided with a solution suitable for many purposes, the solution path previously applied or offered being not yet satisfactory for certain purposes.

When storing hydrogen by means of metal hydrides, as described in the above document, the hydrogen is chemically bonded and a corresponding metal hydride is formed. By supplying energy, i.e. by heating the metal, the hydrogen is liberated again such that the reaction is completely reversible. A disadvantage of storing hydrogen by means of a metal hydride is the relatively low rate of reaction which has led to storage times of several hours. In the case of the species-appropriate metalliferous, hydrogen storing material, a catalysing agent had been added in the form of a metal oxide in order to accelerate hydrogenation or dehydrogenation, an extraordinarily high increase in the rate of reaction having been achieved during taking up and releasing, having led to fairly useful solutions for normal use in many cases of application. For certain cases of application, the species-appropriate metalliferous, hydrogen storing material containing a catalysing agent in the form of a metal oxide is still not yet sufficient with respect to any desired and/or necessary rate of reaction during the hydrogenation and dehydrogenation, particularly since catalysing agents based on nitrides, oxides and carbides reduce a weight-related storage capacity of the hydrogen-storing material as a result of the partly high densities.

It is consequently the object of the present invention to create a metalliferous material such as a metal, a metal alloy, an intermetallic phase, composite materials of metals and corresponding hydrides by means of which the rate of reaction during hydrogenation and dehydrogenation is further substantially improved compared with the corresponding ability of such metals, metal alloys, intermetallic phases, composite materials of metals and of corresponding hydrides, even if these contain catalysing agents in the form of metal hydrides, such that these are utilisable also as energy storages in the case of which a very rapid energy uptake and/or energy release is important and/or an extremely rapid hydrogenation and dehydrogenation is possible, a process for the production of a metalliferous, water-storing material such as a metal, a metal alloy, an intermetallic phase and a composite material of these materials having to be simply and cost effectively feasible such that materials produced in this way can be used on an industrial scale in a cost effective manner as hydrogen storages in the case of which the technically very high rate of reaction is guaranteed during hydrogenation and dehydrogenation.

With respect to the metalliferous, hydrogen-storing material, the object is achieved by the catalysing agent being a metal carbonate.

In this context, the fact was put to use that, in comparison with pure metals, metal carbonates are brittle as a result of which an even smaller particle size than previously is achieved and an even more homogeneous distribution is achievable in the material according to the invention leading to the reaction kinetics being substantially increased compared with the use of metallic catalysing agents. A further essential advantage is the fact that metal carbonates can regularly be made available at much more advantageous prices than metals and/or metal alloys such that the target, aimed at by the invention, of the storage materials according to the invention being made available inexpensively on an industrial scale, is achieved.

The advantages of metal carbonates as catalysing agents in comparison with other catalysing agents consist also of more rapid kinetics being achievable than with all other catalysing agents, an improved ratio of activity to weight and, as mentioned above, a more cost effective provision than in the case of metals.

According to an advantageous variation of the metalliferous material, the metal carbonate consists of mixtures of metal carbonates, i.e. it is possible in principle to use different metal carbonates as catalysing agents in the same metalliferous, hydrogen-storing material for certain applications, a further improvement in the reaction kinetics being achieved in the case of certain quantitatively and qualitatively selectable mixtures.

It is also advantageous for certain applications to allow the metal carbonate to consist of mixed carbonates of metals leading, in the case of certain qualitative and quantitative mixing ratios and mixing components, also to an increase in the reaction kinetics during hydrogenation and dehydrogenation of the hydrogen-storing material.

It has been explained above that metal according to the meaning of the species of the hydrogen-storing material according to the invention is to include, in terms of concept, also metal alloys, intermetallic phases, composite materials of metals and corresponding hydrides.

Preferably, however, the metalliferous material is selected for certain applications in such a way that the metal carbonate is a carbonate of an elemental metal. In principle, moreover, the metal carbonates can preferably be the respective carbonate of the metals Li, Be, B, Na, Mg, Al, Si, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Cs, Ba, La, Hf, Ta, W, Re, Os, Ir, Pt, Au, Hg, Tl, Pb, Fr, Ra, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lw.

However, it is also possible advantageously to select the metal carbonate in such a way that it is the carbonate of the metals or metal mixtures of the rare earths.

According to a further advantageous other variation of the invention, the metal carbonate is formed by different metal carbonates of the same metal, special field of applications for the hydrogen-storing material being taken into consideration, in order to satisfy certain requirements regarding the desired reaction kinetics to be achieved.

Finally, it is advantageous to provide the metalliferous material and/or the catalysing agent with a nanocrystalline structure, as a result of which it is possible to again increase the rate of reaction of hydrogenation and/or dehydrogenation of the metalliferous, hydrogen-storing material.

The process for the production of a metalliferous, hydrogen-storing material for achieving the above-mentioned object which equally applies to the production process, is characterised in that the metalliferous material and/or the catalysing agent is/are subjected to a metal mechanical milling process.

As a result, a powder is advantageously obtained from the metalliferous material and/or the catalysing agent in such a way that an optimised reaction surface and a highly advantageous defect structure is obtained in the volume of the hydrogen-storing material as a whole and a homogeneous distribution of the catalysing agent becomes possible therein.

An advantageous variation of the process is obtained by carrying out the milling process as a function of the metalliferous material and/or the catalysing agent for different lengths of time such that, depending on the time length, the optimum surface desired for the hydrogen-storing material and the optimum distribution desired for the catalysing can be achieved therein. Milling of the catalysing agent and milling of the metalliferous material can be chosen for different lengths and is chosen in such a way that the degree of pulverisation of the metalliferous material is adjusted in an optimum manner to the desired degree of pulverisation of the catalysing agent.

According to a further advantageous variation of the process it is also possible for the metalliferous material to be subjected first to the milling process and subsequently, following the addition of the catalysing agent to it, for the milling process to be continued with respect to the metalliferous material and the catalysing agent, but it is also advantageously possible for the catalysing agent to be subjected to the milling process first and subsequently, following the addition of the metalliferous material to it, the milling process to be continued with respect to the catalysing agent and the metalliferous material.

The different modifications of the process control described above are selected in each case as a function of the degree of pulverisation of the catalysing agent and the degree of pulverisation of the metalliferous material which is decisive for optimum possible reaction kinetics as a function of the metal chosen with respect to the suitable catalysing agent chosen for this purpose.

However, it also needs to be pointed out that it is possible, in principle and within the scope of the invention that, advantageously, the metalliferous material and the catalysing agent are ground jointly (from the beginning) until the predetermined degree of pulverisation is achieved.

The duration of the milling process which, again, can be selected as a function of the hydrogen-storing metal and as a function of the catalysing agent selected is situated, within the lower range, already in the range of a few minutes—as shown by experiments—in order to achieve optimum reaction kinetics for a certain selection of the hydrogen-storing material and the catalysing agent. Preferably, the duration of the milling process is thus in the region of at least 1 min. up to a duration of 200 h.

Thus particularly good reaction kinetics are possible, for example, with 20 h milling of a catalysing agent in the form of $MnCO_3$.

In order to prevent the metalliferous hydrogen-storing material and/or the catalysing agent from reacting, during the milling process, with the surrounding gas in which the milling process takes place, the milling process is advantageously carried out under an inert gas atmosphere, the inert gas being preferably argon; however, it can also be nitrogen, in principle. However, it should be pointed out that, in principle, the process can also be carried out under an atmosphere of ambient air, depending on the type of the metal on which the metalliferous material is based (according to the meaning of the above definition) and as a function of the catalysing agent chosen. Metal carbonates can also be produced in-situ by milling with organic solvents. In another embodiment, the milling process is carried out under a CO and/or $CO_2$-containing atmosphere.

The invention will now be explained in summary in further detail with reference to the two figures. In these FIG. 1 shows a comparison of the hydrogen absorption kinetics of magnesium with 1 mole % $MnCO_3$ with a milling time of 20 h and 1 mole % $Cr_2O_3$ with a milling time of 100 h at a temperature of 300° C. and a hydrogen pressure of 8.4 bar and FIG. 2 shows a comparison of the hydrogen desorption kinetics of magnesium with 1 mole % $MnCO_3$ and a milling time of 20 h and 1 mole % $Cr_2O_3$ with a milling time of 100 h at a temperature of 300° C. under vacuum.

The metalliferous hydrogen-storing material is used as hydrogen storage which can be charged and discharged. The chemical-physical process of storing hydrogen consists of the hydrogenation of the material and the dehydrogenation during discharging. To accelerate hydrogenation and dehydrogenation, a metal carbonate is used as catalysing agent. The metalliferous, hydrogen-storing material is required in the powder form in order to have an extremely large reaction surface at one's disposal. The same applies in principle also to the catalysing agent in the form of the metal carbonate. The content of catalysing agent can be 0.005 mole % to 20 mole %, for example.

In order to have the actual metalliferous, hydrogen-storing material and/or the catalysing agent at hand in powder form, the catalysing agent and/or the metalliferous material is/are subjected to a mechanical milling process.

Figure 2:
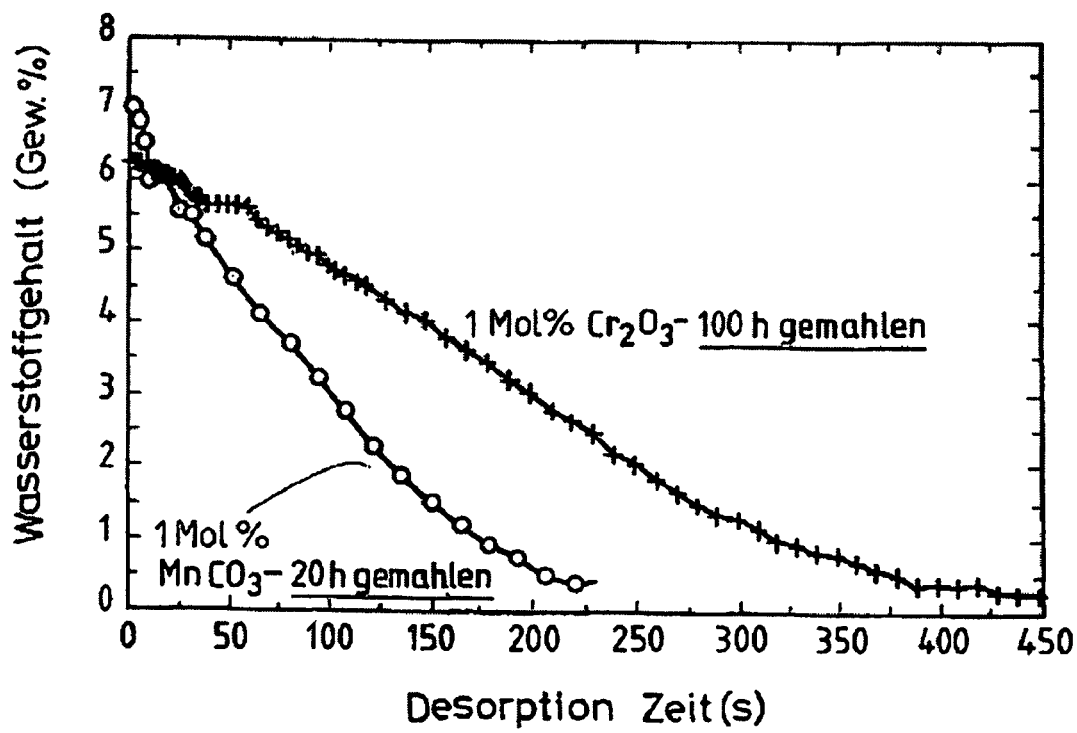

With reference to FIG. 1, it can be seen that, by means of the catalysing agent according to the invention in the form of a metal carbonate, much more rapid hydrogen absorption kinetics can be achieved in the present case of the composition $MnCO_3$ than with the best oxydic catalysts used so far such as those described e.g. in DE-A-199 13 714 which goes back to the same applicant. The said metal-oxydic catalysing agents are used therein. In addition, a reversible storage capacity more than 20% higher is achieved as a result of the lower density of the catalysing agents according to the invention based on metal carbonates. Moreover, it is possible by means of the catalysing agent according to the invention based on metal carbonates to carry out the hydrogenation of the metalliferous, hydrogen-storing material at temperatures which are considerably lower in comparison with catalysed reactions based on catalysing agents of the metal-oxydic type and reduced even more strongly in comparison with non-catalysed reactions.

FIG. 1

Abscissa: Absorption time (s)

Ordinate: Hydrogen content (% by weight)

1 Mole % $MnCO_3$—milled for 20 h

1 Mole % $Cr_2O_3$—milled for 100 h

FIG. 2

Abscissa: Desorption time (s)

Ordinate: Hydrogen content (% by weight)

The invention claimed is:

1. Metalliferous, hydrogen-storing material, comprising
a metal for the taking up and releasing of hydrogen, said metal exhibiting a nanocrystalline structure, and
a catalyzing agent for the taking up and releasing of hydrogen by the metal, wherein the catalyzing agent is a metal carbonate which also exhibits a nanocrystalline structure, wherein the metal carbonate is the carbonate of a metal selected from the group consisting of Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, La, Hf, Ta, W, Re, Os, Ir, Pt, Au, Hg, Tl, Pb, Ce, Pr, Nd, Pm, Sm, Eu, Gd, Tb, Dy, Ho, Er, Tm, Yb, Lu, Th, Pa, U, Np, Pu, Am, Cm, Bk, Cf, Es, Fm, Md, No, Lw, and mixtures thereof, and wherein the metalliferous material comprises a homogeneous distribution of the metal and the catalyzing agent.

2. Metalliferous material according to claim 1, wherein the metal carbonate consists of a plurality of metal carbonates.

3. Metalliferous material according to claim 1, wherein the metal carbonate is the carbonate of the metals or metal mixtures of the rare earths.

4. Metalliferous material according to claim 1, wherein the carbonate is formed in-situ from the hydrogen-storing material by the addition of an organic solvent.

5. Metalliferous material according to claim 1, wherein the carbonate content is between 0.005 mole % and 20 mole %.

6. Process for the production of a metalliferous, hydrogen-storing material according to claim 1, wherein the metalliferous material and/or the catalyzing agent is or are subjected to a mechanical milling process, wherein the milling process is carried out with an addition of an organic solvent.

7. Process for the production of a metalliferous, hydrogen-storing material according to claim 1, wherein the metalliferous material and/or the catalyzing agent is or are subjected to a mechanical milling process, wherein the milling process is carried out under a CO and/or $CO_2$-containing atmosphere.

8. Process for the production of a metalliferous, hydrogen-storing material according to claim 1, the process comprising:
milling of the metalliferous material, and
milling of the catalyzing agent; until a predetermined degree of pulverization is achieved.

9. Process according to claim 8, wherein the milling process is carried out for periods of different lengths depending on the metalliferous material and/or catalyzing agent.

10. Process according to claim 9, wherein the metalliferous material is first subjected to the milling process and subsequently, following the addition of the catalyzing agent to it, the milling process is continued with respect to the metalliferous material and the catalyzing agent.

11. Process according to claim 9, wherein the catalyzing agent is first subjected to the milling process and subsequently, following the addition of the metalliferous material to it, the milling process is continued with respect to the catalyzing agent and the metalliferous material.

12. Process according to claim 9, wherein the metalliferous material and the catalyzing agent are subjected separately to a milling process respectively and subsequently mixed.

13. Process according to claim 9, wherein the metalliferous material and the catalyzing agent are ground jointly.

14. Process according to claim 8, wherein the metalliferous material is first subjected to the milling process and subsequently, following the addition of the catalyzing agent to it, the milling process is continued with respect to the metalliferous material and the catalyzing agent.

15. Process according to claim 8, wherein the catalyzing agent is first subjected to the milling process and subsequently, following the addition of the metalliferous material to it, the milling process is continued with respect to the agent and the metalliferous material.

16. Process according to claim 8, wherein the metalliferous material and the catalyzing agent are subjected separately to a milling process respectively and subsequently mixed.

17. Process according to claim 8, wherein the metalliferous material and the catalyzing agent are ground jointly.

18. Process according to claim 8, wherein the duration of the milling process is in the range of from 1 minute to 200 hours.

19. Process according to claim 18, wherein the duration of the milling process is in the range of from 20 hours to 100 hours.

20. Process according to claim 8, wherein the milling process is carried out under an inert gas atmosphere.

21. Process according to claim 20, wherein the inert gas is argon.

22. Process according to claim 8, wherein the milling process is carried out with an addition of an organic solvent.

23. Process according to claim 8, wherein the milling process is carried out under a CO and/or $CO_2$-containing atmosphere.

24. Process according to claim 8, wherein the predetermined degree of pulverization is a homogeneous distribution of the metal and the catalyzing agent.

25. Metalliferous, hydrogen-storing material, comprising:
a metal for the taking up and releasing of hydrogen, said metal exhibiting a nanocrystalline structure, and
a catalyzing agent for the taking up and releasing of hydrogen by the metal, wherein the catalyzing agent comprises a rare earth metal carbonate, and wherein the catalyzing agent exhibits a nanocrystalline structure.

* * * * *